(12) United States Patent
Gierull

(10) Patent No.: US 6,203,629 B1
(45) Date of Patent: Mar. 20, 2001

(54) PROCESS FOR CUTTING COKED METAL MOLDED PARTS

(75) Inventor: Horst Gierull, Gelsenkirchen (DE)

(73) Assignee: Ruhr Oel GmbH, Gelsenkirchen (DE)

( * ) Notice: Subject to any disclaimer, the term of this patent is extended or adjusted under 35 U.S.C. 154(b) by 0 days.

(21) Appl. No.: 09/271,875

(22) Filed: Mar. 18, 1999

(30) Foreign Application Priority Data

Mar. 18, 1998 (DE) .............................................. 198 11 672

(51) Int. Cl.$^7$ ...................................................... B23K 7/00
(52) U.S. Cl. .......................... 148/201; 148/194; 148/555; 148/675
(58) Field of Search ..................................... 148/201, 194, 148/555, 675, 286, 316; 260/48; 134/7

(56) References Cited

U.S. PATENT DOCUMENTS

| 3,641,190 | * | 2/1972 | Kivlen et al. ............................. 134/7 |
| 4,297,147 | * | 10/1981 | Nunciato et al. ......................... 134/7 |
| 5,087,596 | * | 2/1992 | Clark et al. .............................. 502/49 |
| 5,169,515 | * | 12/1992 | Ngan et al. ............................. 148/286 |

OTHER PUBLICATIONS

Robert L. Strohl, "Air Carbon Arc Cutting", ASM Handbook, vol. 6, Welding, Brazing and Soldering, ASM International, pp. 1172–1177, (1993).

H. Mair "Brennschneiden—Mit Oder Ohne Vorwarmen," Der Praktiker, pp. 48–1482, Aug. 1992.

* cited by examiner

*Primary Examiner*—Scott Kastler
(74) *Attorney, Agent, or Firm*—Oblon, Spivak, McClelland, Maier & Neustadt, P.C.

(57) ABSTRACT

A process for cutting coked metal includes cutting with a flame or by electrowelding after the coked metal has been heated sufficiently to relieve stresses in the metal.

36 Claims, No Drawings

PROCESS FOR CUTTING COKED METAL MOLDED PARTS

BACKGROUND OF THE INVENTION

1. Field of the Invention

The invention relates to a process for cutting coked metal molded parts.

2. Discussion of the Background

In large-scale factories, in which hydrocarbons are exposed to high temperatures, these hydrocarbons decompose and form coke deposits on the inside walls of the system in which they are used. This particularly holds true for thermal cracking processes in mineral oil processing or petrochemistry, e.g. olefin systems. For example, it is necessary in such olefin systems to decoke the cracking pipes in the ovens. The coke deposits can reach significant thicknesses, up to complete clogging of the pipes. So-called brittle cracking can occur in cracking pipes that are not decoked, after an operating period of about three years. The same holds true if emergency shut-down of the ovens took place. Increased stresses at the pipe wall occur because of the volume increase which results from the formation of carbonized zones inside the pipes. Intergranular stresses result from structural changes. The coke deposits also result in increased stresses in the pipe wall, due to a difference in shrinkage between the coke and the metal. Because of the coke deposits that remain in the cracking pipes, significant tensile stresses occur during cooling, because the coke deposits have a significantly smaller heat expansion coefficient than the metal material. Cutting the metal by usual cutting methods, such as cutting wheels or air saws, is not possible without danger, since the pipes can burst and pieces of pipe can fall unchecked into the oven space. Water cutting can also be used only with restrictions, and requires additional complicated measures for protecting workers. Breaking the coked molded parts out using hydraulic presses is not a suitable method, due to the fact that it could bring about secondary damage, for example, to the surrounding walls.

SUMMARY OF THE INVENTION

An object of the present invention is a process which makes it possible to cut coked molded parts, without any great hazard potential for the persons who perform the process, and without bringing about additional material or secondary damage.

Another object of the present invention is a process to cut molded parts on which coke deposits with a thickness of 20 mm and more have formed.

Still another object of the present invention is a process to cut molded parts which are made from a high-alloy steel and which cannot be cut using known thermal cutting methods, such as autogenic flame cutting.

These objects are accomplished by a process for cutting coked metal molded parts, where the molded parts are preheated to 700–900° C., preferably approximately 850° C.

DETAILED DESCRIPTION OF THE INVENTION

Surprisingly, it was found that it is possible to cut coked molded parts in a simple manner, if they have been previously stress-relieved. Stress-relieved coked metal can be prepared by preheating coked metal to any temperature sufficient to relieve stresses in the metal caused by the volume increase resulting from build up of coke layers, and the differences in the heat expansion coefficient of the coke and the metal. For example, stress-relieved coked metal can be produced by heating the coked metal to 700–900° C. Preferably, the material is heated to 800–900° C., more preferably approximately 850° C. The resulting stress-relieved material can then be cut with a flame. With preheating, stress caused by differences in the heat expansion coefficients of the deposited coke and the metal is reduced, so that hazard-free cutting is guaranteed. In a preferred embodiment of the process, according to the present invention, the molded element is preheated over a length of from 50–100 mm, preferably 60–90 mm, more preferably approximately 80 mm. Cutting takes place after preheating, approximately in the middle of the preheated zone. Preferably, preheating takes place by means of a gas/oxygen flame, particularly with a tip of 20–30 mm. In a particularly advantageous embodiment, preheating can take place with two or more flames.

Cutting of the molded parts is preferably carried out by an electrowelding process, particularly with a gouging torch, as described in "Air-Carbon Arc Cutting", ASM Handbook, Volume 6, Welding, Brazing and Soldering, ASM International, 1993, pp. 1172–1177, incorporated herein by reference. The work is performed with a 2–15 mm diameter rod electrode, preferably with a 4–10 mm diameter rod electrode, more preferably with a 4 mm diameter rod electrode. The electrowelding process uses a current of 300–1000 amperes, preferably a current of 300–800 amperes, more preferably a current of 300–600 amperes, and even more preferably approximately 450 amperes. Electrodes with the DIN designation E 4343 RR (B 7), for example SH yellow R, are suitable. The use of special electrodes which are particularly suited for gouging, grooving, or melt cutting have proven to be advantageous. These are, for example, electrodes with the designation "PH ÖNIX NUT S" (PHOENIX GROOVE SI from THYSSEN SCHWEISSTECHNIK) or "FOX NUT" (FOX GROOVE from BÖHLER). These special electrodes offer the advantage that the coke layer can be broken up to a great extent. Usually, when performing this work, spark protection is provided using the protective devices known to a person skilled in the art, and the welding gases are drawn off.

Metal molded parts that can be cut with the process according to the present invention are particularly molded parts produced by spin casting, preferably pipes produced by spin casting.

The process according to the present invention can even be used advantageously, as compared with other methods, if the deposited coke layers have a thickness of 20 mm or more, for example, a thickness of 20–100 mm. The process is particularly suitable for cutting molded parts made of high-alloy chrome-nickel steels, particularly when the alloy has the composition 0.3–0.5 wt. % carbon, 1.0–2.5 wt. % silicon, up to 1.5 wt. % manganese, 20–50 wt. % chromium, and 10–70 wt. % nickel.

Having generally described this invention, a further understanding can be obtained by reference to certain specific examples which are provided herein for purposes of illustration only and are not intended to be limiting unless otherwise specified.

EXAMPLE

After an emergency shut-down of an olefin system, it was no longer possible to decoke the cracking pipes in the ovens, made of high-alloy chrome-nickel steel, in the conventional manner. The accumulated coke deposits had a thickness of up to 50 mm. Using the process according to the invention, it was possible to cut four pieces of pipe, with a length of approximately three meters each, from the breeches pipe and from the elbows, within a very short period of time (1.5 hours) and without hazard, and to remove them from the oven. The pipes cut in this way did not crack or burst, so that there was no danger for the persons performing the work. Because of the relatively rapid removal of the coked pipes, it was possible to start installation of new pipes immediately, so that it was possible to keep the production stoppage very short, in comparison with conventional working times.

The priority document of the present application, German patent application 198 11 672.1 filed Mar. 18, 1998, is incorporated herein by reference.

Obviously, additional modifications and variations of the present invention are possible in light of the above teachings. It is therefore to be understood that within the scope of the appended claims, the invention may be practiced otherwise than as specifically described herein.

What is claimed is:

1. A process for cutting coked metal, comprising:
   cutting stress-relieved coked metal.
2. The process according to claim 1, wherein the stress-relieved coked metal is cut with a flame.
3. The process according to claim 1, wherein the stress-relieved coked metal is cut with an electrowelding process.
4. The process according to claim 3, wherein said cutting is cutting with a current of 300–1000 amperes.
5. The process according to claim 3, wherein the stress-relieved coked metal is cut with a rod electrode.
6. The process according to claim 5, wherein the rod electrode has a diameter of 2–15 mm.
7. The process according to claim 5, wherein the rod electrode is selected from the group consisting of gouging, grooving, and melt cutting electrodes.
8. The process according to claim 1, wherein said stress-relieved coked metal is prepared by a process comprising:
   heating coked metal to 700–900° C.
9. The process according to claim 8, wherein the coked metal is heated to 800–900° C.
10. The process according to claim 8, wherein the coked metal is heated to approximately 850° C.
11. The process according to claim 8, wherein the coked metal is heated with a plurality of flames.
12. The process according to claim 8, wherein said heating is heating a zone 50–100 mm long.
13. The process according to claim 1, wherein the stress-relieved coked metal comprises:
    a coke layer and a metal layer.
14. The process according to claim 13, wherein the stress-relieved coked metal comprises only the coke layer or a plurality of coke layers, and the metal layer, and
    the coke layer or layers have a thickness of 20–100 mm.
15. The process according to claim 13, wherein the metal layer comprises a high alloy steel.
16. The process according to claim 13, wherein the metal layer comprises 0.3–0.5 wt. % carbon, 1.0–2.5 wt. % silicon, up to 1.5 wt. % manganese, 20–50 wt. % chromium, and 10–70 wt. % nickel.
17. The process according to claim 13, wherein the metal layer is molded.
18. The process according to claim 13, wherein the metal layer is spun cast.
19. The process according to claim 13, wherein the metal layer is spun cast pipe.
20. A process for preparing stress-relieved coked metal, comprising:
    heating coked metal to a temperature sufficient to relieve stresses in said coked metal, wherein the coked metal comprises a coke layer and a metal layer.
21. The process of claim 20, wherein the temperature is 700–900° C.
22. The process of claim 20, wherein the temperature is 800–900° C.
23. The process of claim 20, wherein the temperature is approximately 850° C.
24. The process of claim 20, wherein said heating is heating with a plurality of gas/oxygen flames.
25. The process according to claim 20, wherein said heating is heating a zone 50–100 mm long.
26. The process according to claim 20, wherein the metal layer comprises high alloy steel.
27. The process according to claim 20, wherein the metal layer comprises 0.3–0.5 wt. % carbon, 1.0–2.5 wt. % silicon, up to 1.5 wt. % manganese, 20–50 wt. % chromium, and 10–70 wt. % nickel.
28. The process according to claim 20, wherein the metal layer is spun cast pipe.
29. Stress-relieved coked metal, comprising:
    a metal layer and a coke layer, wherein said coked metal is stress-relieved.
30. The stress-relieved coked metal according to claim 29, wherein the coke layer has a thickness of 20–100 mm.
31. The stress-relieved coked metal according to claim 29, wherein the metal layer comprises a high-alloy steel.
32. The stress-relieved coked metal according to claim 29, wherein the metal layer comprises 0.3–0.5 wt. % carbon, 1.0–2.5 wt. % silicon, up to 1.5 wt. % manganese, 20–50 wt. % chromium, and 10–70 wt. % nickel.
33. The stress-relieved coked metal according to claim 29, wherein the metal layer is spun cast pipe.
34. Cut stress-relieved coked metal prepared by the process of claim 1.
35. Stress-relieved coked metal prepared by the process of claim 20.
36. Stress-relieved coked metal prepared by the process of claim 21.

* * * * *